United States Patent
Martin et al.

(10) Patent No.: US 6,695,175 B2
(45) Date of Patent: Feb. 24, 2004

(54) PISTON OPERATED FLUID DISPENSING DEVICE

(75) Inventors: James H. Martin, 8322 County Line Rd., Burr Ridge, IL (US) 60521; Reuben Oder, Lebanon, OH (US)

(73) Assignee: James H. Martin, Burr Ridge, IL (US)

( * ) Notice: Subject to any disclaimer, the term of this patent is extended or adjusted under 35 U.S.C. 154(b) by 104 days.

(21) Appl. No.: 10/131,754

(22) Filed: Apr. 24, 2002

(65) Prior Publication Data

US 2003/0201284 A1 Oct. 30, 2003

(51) Int. Cl.[7] .............................................. B65D 88/54
(52) U.S. Cl. .................... 222/309; 222/321.9; 222/341; 222/402.2
(58) Field of Search ................................ 222/309, 341, 222/321.9, 402.2

(56) References Cited

U.S. PATENT DOCUMENTS

| 4,892,232 A | 1/1990 | Martin |
| 5,085,351 A | 2/1992 | Martin |
| 5,105,995 A | 4/1992 | Martin |
| 5,183,187 A | 2/1993 | Martin |
| 5,199,616 A | 4/1993 | Martin |
| 5,484,088 A | 1/1996 | Martin |
| 6,394,317 B1 * | 5/2002 | Faughey et al. ............. 222/309 |
| 6,443,331 B1 * | 9/2002 | DeJonge ................. 222/153.13 |

* cited by examiner

*Primary Examiner*—Philippe Derakshani
(74) *Attorney, Agent, or Firm*—Robert L. Marsh

(57) ABSTRACT

A valve assembly includes a valve housing defining a metering chamber and an elongated stem. The stem is axially movable with respect to the valve housing for dispensing liquid and is rotatable for adjusting the length of the stroke of a piston to thereby select the volume of liquid dispensed with each actuation of the stem. A sliding float member is fitted around the stem within the chamber and is axially slidable with respect to the stem but is locked for rotation with the stem. The lower surface of the sliding float abuts, and floats above the upper surface of the piston, and the lower end of the stem is rotatable within the piston. A spring extends between a prong on the stem and the sliding float for urging the stem axially outward of the container and for urging the piston in a direction which maximizes the volume of the metering chamber such that the spring rotates with the stem and the stem rotates free of the piston.

6 Claims, 9 Drawing Sheets

PISTON OPERATED FLUID DISPENSING DEVICE

The present application relates to devices for dispensing a predetermined volume of liquid, as for example, for medication, and in particular to an adjustable device in which the user can select one of a plurality of volumes of liquid to be dispensed.

BACKGROUND OF THE INVENTION

Certain liquids, for example liquid medication, are needed in small predetermined amounts, and therefore it is desirable to have a dispensing device for dispensing predetermined amounts of liquid. In my U.S. Pat. No. 4,892,232 I disclosed such a device.

The amount of medication needed by a first patient may be different from the amount of medication needed for a second patient, and therefore it is also desirable to provide an adjustable dispensing device whereby the operator can operate a selector device and choose the desired volume of liquid that the dispenser will dispense. An adjustable dose dispenser having a plurality of different sized metering chambers with a stem rotatable to select the chamber to be discharged was disclosed in my U.S. Pat. No. 5,085,351. In this device, each of the metering chambers has a flexible wall.

As an alternative to selecting one of a plurality of chambers for varying the volume of fluid to be dispensed, a device can be configured with a single chamber where the volume dispense from the chamber is adjustable. This can be accomplished by providing a piston for dispensing the liquid from the chamber where the length of the piston stroke is adjustable, as disclosed in my previously issued U.S. Pat. No. 5,813,187.

One disadvantage of the adjustable dose dispenser as disclosed in my U.S. Pat. No. 5,085,351 is that the flexible member which forms the metering chambers thereof may yield over time, causing the volume dispensed to change. The piston operated dispensing device of my U.S. Pat. No. 5,183,187, on the other hand, has rigid walls such that the volume of liquid dispensed for any given setting thereof should remain constant through the life of the apparatus.

One problem with the piston operated device of my U.S. Pat. No. 5,183,187 is that the volume of liquid being dispensed is adjusted by rotating the stem of the dispensing valve and the valve stem is connected to the piston and a threaded member. To operate properly, however, the piston is sealed against the cylindrical wall of the metering chamber and the seal around the perimeter of the piston creates resistance, inhibiting the manual rotation of the dispensing stem.

Another problem with the existing piston operated dispenser is that the device includes a spring for urging the piston in a direction that maximizes the volume of the metering chamber and the other end of the spring is fitted against a surface of the housing of the valve such that on rotation of the stem either the piston rotates with respect to the spring or the spring rotates with respect to the housing. In either case the movement of the plastic of the housing or of the piston against the spring causes particles of plastic to enter the liquid being dispensed. The continuing use of the dispenser causes those particles to obstruct the small passages that extend through the stem of the dispenser and thereby inhibit its operation.

There is therefore, a need for an improved piston operated dispensing apparatus in which the volume of liquid being dispensed may be more easily adjusted and which will not cause small particles of plastic to be released into the liquid.

SUMMARY OF THE INVENTION

Briefly, the present invention is embodied in a dispensing apparatus for dispensing one of a plurality of predetermined volumes of a liquid. The device includes a container for retaining pressurized liquid and a valve assembly that extends into the container. The valve assembly includes an elongated stem having a first end extending outward of the container and a second end extending inward of the container, the valve assembly also having a longitudinal axis. The valve assembly also includes a valve housing having an inner wall that defines a metering chamber. At the bottom end of the metering chamber is a longitudinally movable piston having a first surface that defines a wall of the metering chamber and a second surface that is in contact with the pressurized liquid.

The elongated stem is axially movable with respect to the valve housing between a first position in which the metering chamber is in communication with the reservoir and a second position in which the metering chamber is in communication with the ambient. The piston is axially moveable with respect to the stem between a first stop which defines a maximum volume of the metering chamber and a second stop which defines the minimum volume of the metering chamber. The stem is axially rotatable with respect to the piston such that rotation of the stem will not cause rotation of the piston. A sliding float member is fitted around the stem within the chamber and is axially slidable with respect to the stem but is locked for rotation with the stem, and the lower surface thereof abuts, and floats above the first surface of the piston.

In accordance with one feature of the invention, a prong is provided in the stem and a spring extends between the prong on the stem and the sliding float for urging the stem axially outward of the container and for urging the piston in a direction which maximizes the volume of the metering chamber. Since both the sliding float member and the prong rotate with the stem, rotation of the stem will not cause movement of a plastic surface against the metal of the spring. Accordingly, the rotation of the stem will not cause friction between a plastic surface and the spring causing particles of plastic to enter into the liquid being dispensed.

In accordance with another feature of the invention, the valve housing has a plurality of contact surfaces with each of the contact surfaces being of different angular orientations about the axis thereof and at different longitudinal positions with respect to the axis. The slide also has a contact surface which is rotatable with the stem such that the contact surface of the slide is rotatable into alignment with any one of the plurality of contact surfaces on the valve housing for selecting one of a plurality of predetermined volumes of liquid to be dispensed.

BRIEF DESCRIPTION OF THE DRAWINGS

A better understanding of the present invention will be had after reading of the following detailed description taken in conjunction with the drawings wherein.

DETAILED DESCRIPTION OF A PREFERRED EMBODIMENT

Figure 1:
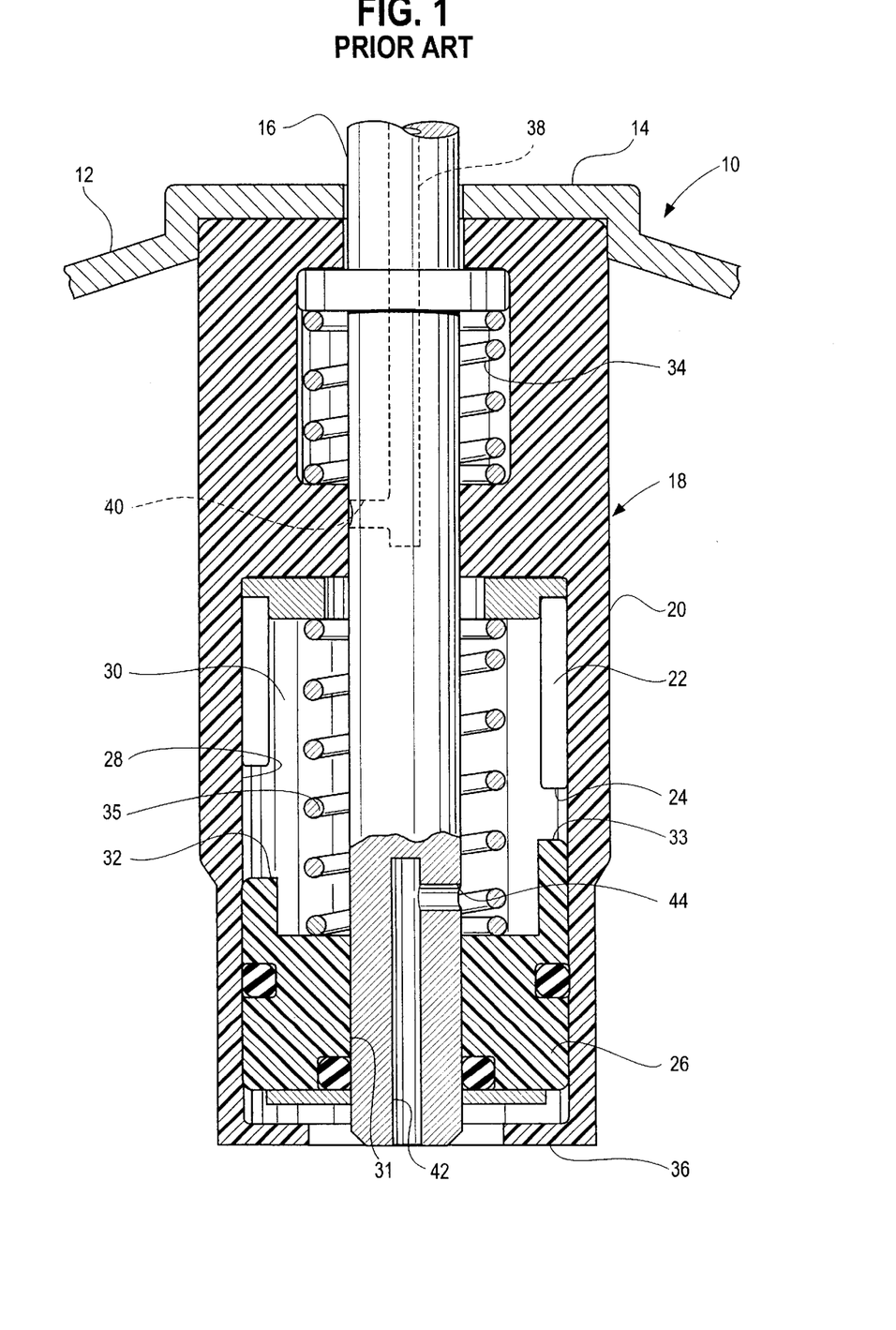
FIG. 1 is a fragmentary cross sectional view of a piston operated dispensing device in accordance with the prior art.

Referring to FIG. 1, a piston operated dose dispenser 10 in accordance with the prior art includes a pressurized container 12 having a cap 14 through which extends a discharge stem 16. The discharge stem 16 extends from the upper end of an elongated valve assembly 18 the lower end of which extends into the cavity of the container 12 and includes a cylindrical housing 20, a sleeve 22, and the lower surface 24 of which has either a spiraled configuration or a plurality of steps with each step defining a different longitudinal position along the length of the housing 20.

A piston 26 at the lower end of the housing has an inner surface which, along with the inner surface 28 of the housing 20, defines a variable volume cavity 30, with the volume of the cavity 30 varying with axial movement of the piston 26.

The piston 26 has a noncircular central opening 31 that fits around a complementarily shaped noncircular portion of the stem 16 such that the piston 26 is axially moveable with respect to both the housing 20 and the stem 16, but will rotate within the housing 20 upon rotation of the stem 16. Around the circumference of the upper surface of the piston 26 is one or more projections 32, 33 which extend axially along the inner surface 28 of the housing 20 and engage portions of the lower surface 24 of the sleeve 22. By rotating the piston 26 the positioning of the projections 32, 33 is changed with respect to the lower surface 24 of the sleeve 22, thereby varying the length of the stroke of the piston 26.

A first coil spring 34 urges the stem 16 outward of the container 12 and a second coil spring 35 urges the piston 26 away from the lower end 24 the sleeve 22 and towards a stop 36 at the lower end of the cylindrical housing 20. Rotation of the stem 16, therefore, causes rotation of the piston 26 and thereby adjusts the length of the stroke of the piston 26 within the cavity 30.

The discharge stem 16 has a first axial passage 38 extending from the upper end thereof to a port 40 in the side wall thereof which, when the stem 16 is depressed, provides communication between the interior of the cavity 30 and the ambient and a second axially passage 42 extending through the lower end thereof and opening through a second port 44 for providing communication between the cavity 30 and the interior of the pressurized container 12 when the stem is not depressed.

When the stem 16 is not depressed, as shown in FIG. 1, the cavity 30 is in communication with the pressurized liquid and the container 12 and the spring 34 urges the piston 24 towards the lower stop 36 to fill the cavity 30 with liquid. When the stem 16 is subsequently depressed the port 44 is closed and the port 40 is opened to ambient pressure. The pressurized liquid in the container 12 thereafter causes movement of the piston 26 forcing liquid through the first passage 38 and expelling it through the upper end of the stem 16 until the piston 26 reaches the lower end 24 of the sleeve 22.

In the embodiment depicted, rotation of the stem 16 causes rotation of the piston 26. The second coil spring 35 extends between the nonrotatable second sleeve 22 and the rotatable piston 26 causing the metal parts of the spring 35 to scrape loose particles from either the sleeve 22 or the piston 26. Also, the piston 26 is sealed around its perimeter to prevent leakage and the seals cause resistance to rotation of the stem 16. The operator is therefore required to exert substantial force to rotate the stem, and the stem 16 must be adequately engineered to endure the torque applied thereto.

Figure 2:
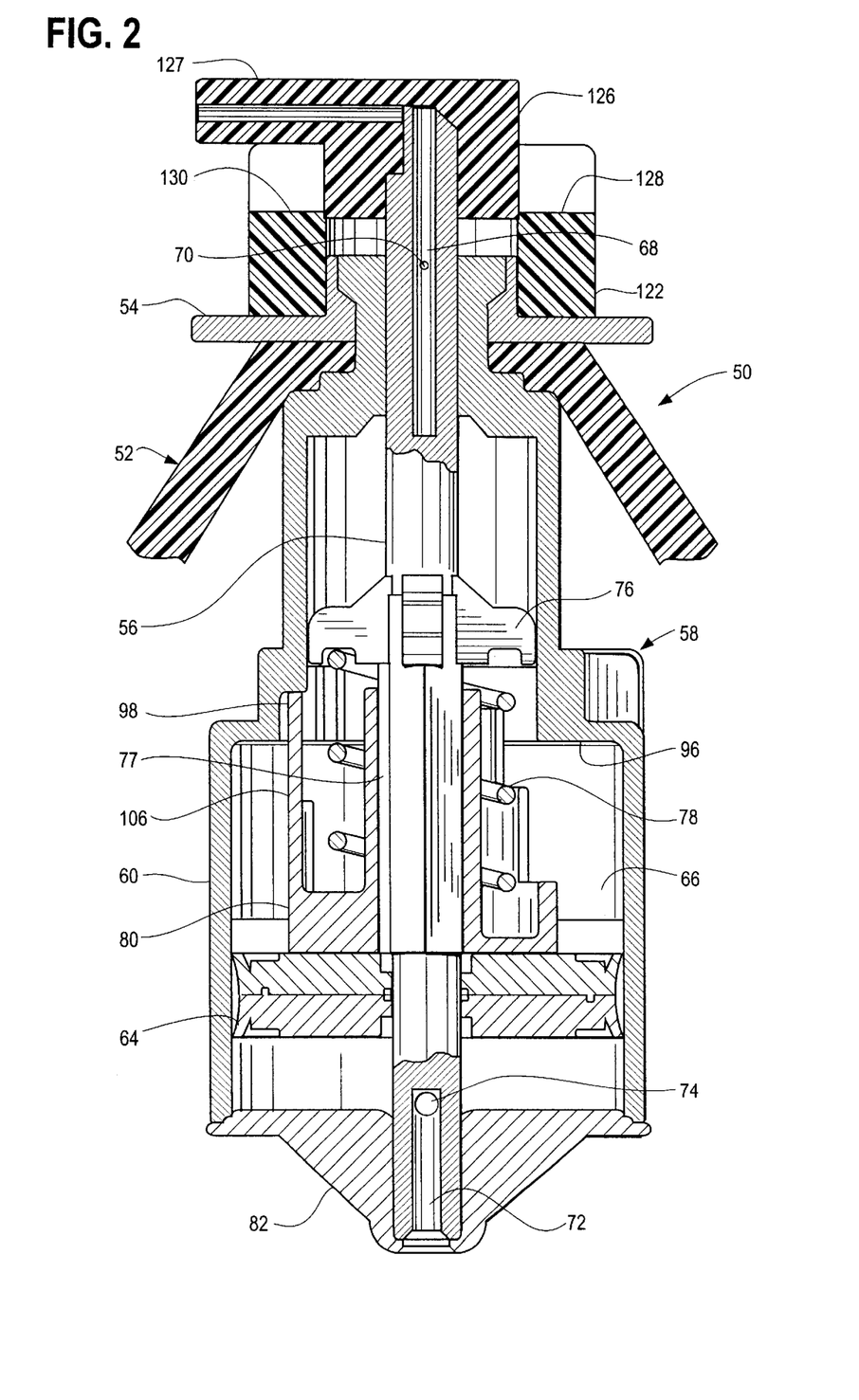
FIG. 2 is a fragmentary cross sectional view of a dispensing device in accordance with the present invention.

Referring to FIG. 2 a dispenser 50 in accordance to the present invention includes a pressurized container 52 having a cap 54, and a discharge stem 56 vertically moveable and rotatable within a valve assembly 58. The valve assembly 58 includes a cylindrical housing 60 at the lower end of which is a vertically moveable piston 64 creating a cavity 66 defined by the inner surface of the housing 60 and the upper surface of the piston 64. The stem 56 has a first axial passage 68 extending through the upper end thereof and opening at a first port 70 for venting the cavity 66 when the stem 56 is depressed and a second axially passage 72 extending into the bottom end thereof and opening at a second port 74 for providing communication between the cavity 66 and the interior of the container 12 when the stem 56 is not depressed.

Figure 3:
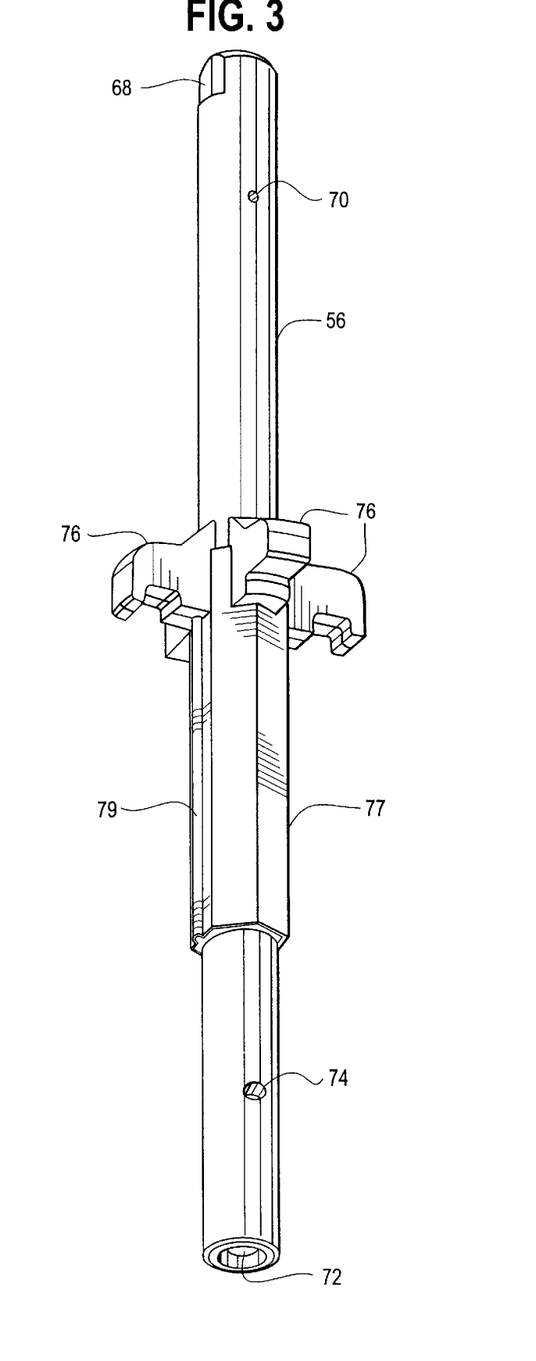
FIG. 3 is an enlarged isometric view of the stem used in the valve assembly shown in FIG. 2.
Figure 4:
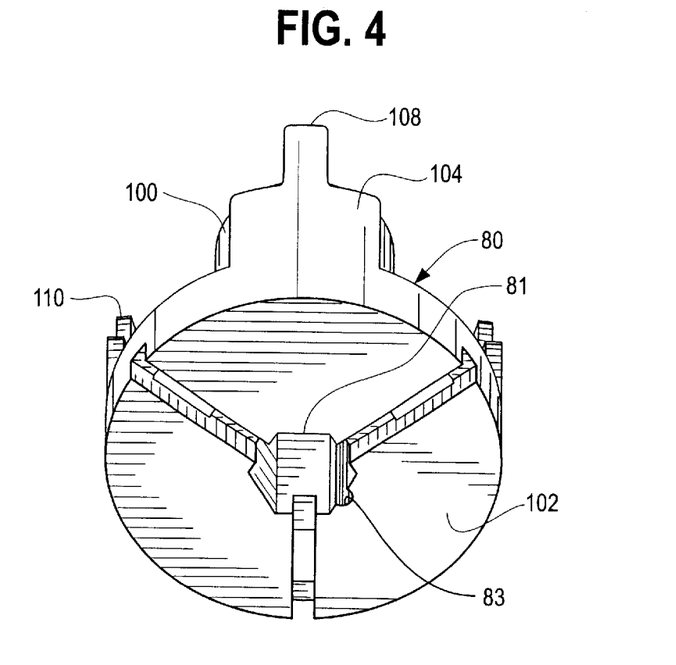
FIG. 4 is an enlarged isometric view of the sliding float member used in the valve assembly shown in FIG. 2.
Figure 5:
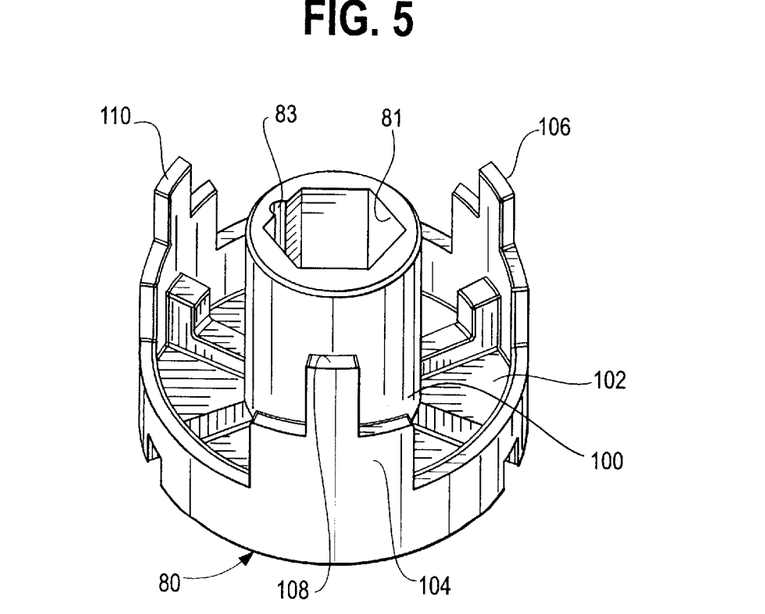
FIG. 5 is another isometric view of the sliding float member shown in FIG. 4.
Figure 7:
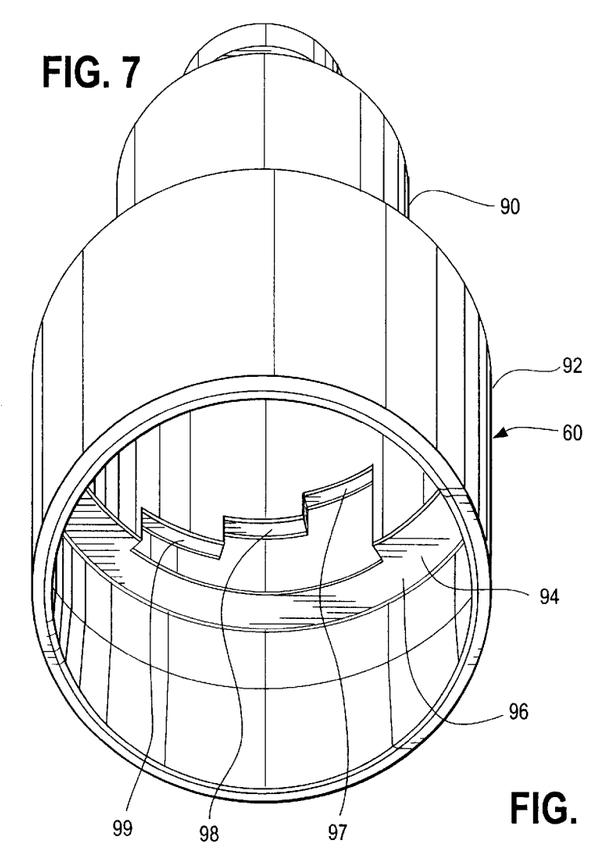
FIG. 7 is another isometric view of the valve housing shown in FIG. 6.
Figure 8:
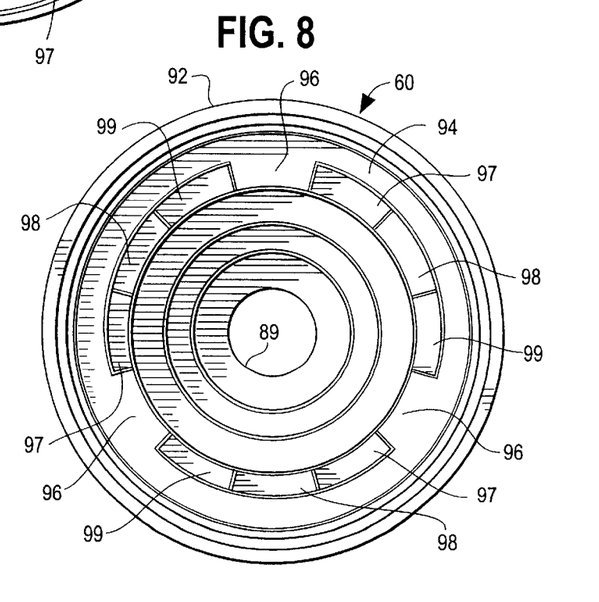
FIG. 8 is a further enlarged bottom view of the valve housing shown in FIG. 6.

Referring to FIGS. 2, 3 and 7, the stem 56 has a plurality of outwardly extending prongs 76 midway along the length thereof for retaining the upper end of a coil spring 78. Below the prongs 76, the stem 56 has a noncircular portion 77 with a longitudinal rib 79 thereon as shown. A sliding float member 80 having a complementary noncircular aperture 81 and a slot 83 for receiving the rib 79 therein is fitted on the noncircular portion 77 of the stem 56 so that the sliding float 80 is longitudinally slidable with respect to the stem 56, and yet the sliding float 80 will rotate with the stem 56. The lower end of the spring 78 is fitted against a surface of the sliding float member 80. The lower end of the sliding float member 80 is rotatably mounted on the upper surface of the piston 64 (floats with respect to the piston), such that the spring 78 urges the stem 56 outward of the container 52 and urges the piston 64 downward against a lower stop 82 as further described below.

Figure 6:
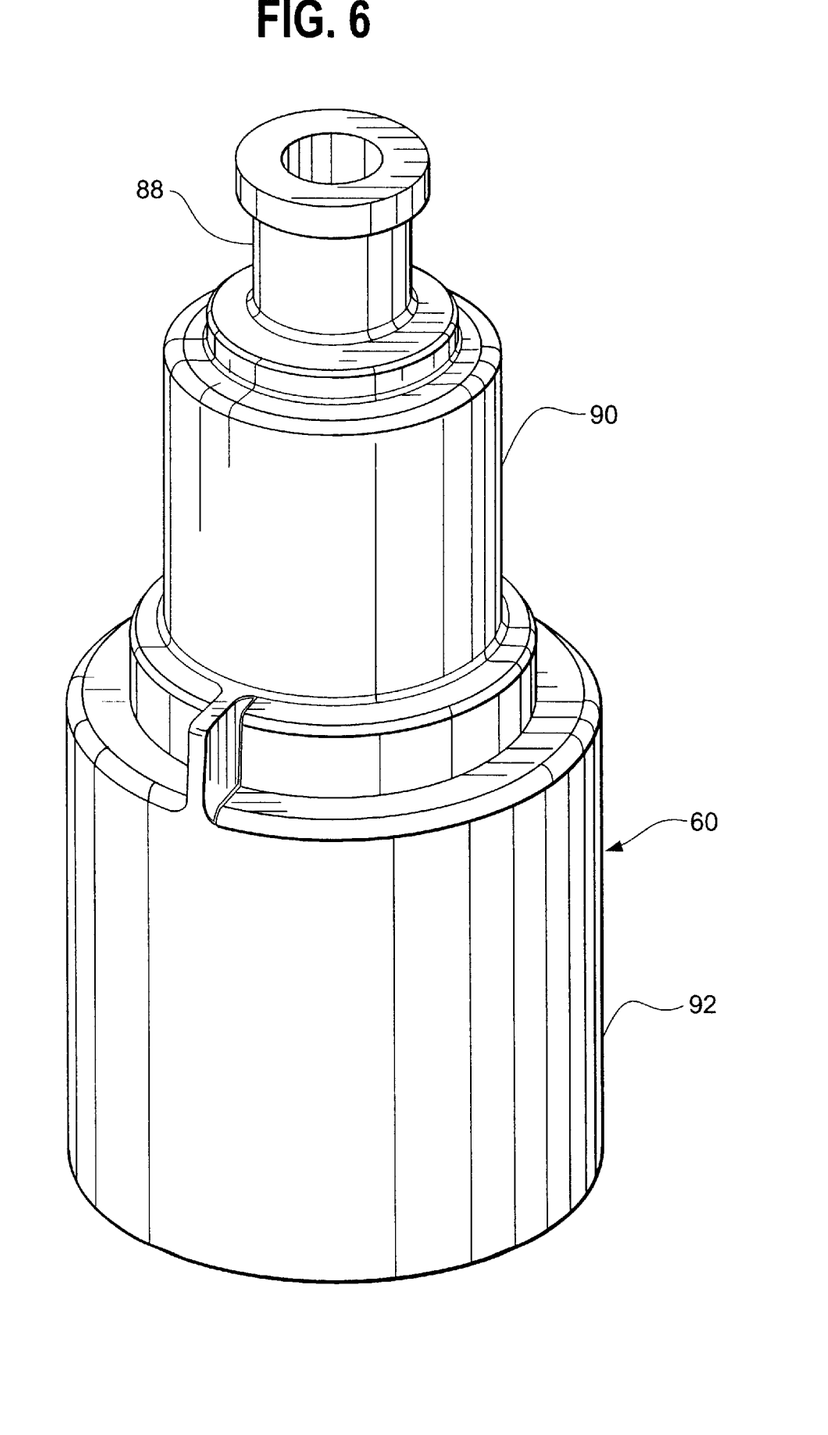
FIG. 6 is an enlarged isometric view of the valve housing of the valve assembly shown in FIG. 2.

Referring to FIGS. 2, 6, and 7, the valve housing 60 is generally tubular in configuration with a small diameter upper end portion 88 having an inner bore 89 sized to slidably receive the discharge stem 56 while sliding along the length thereof. Below the small diameter upper end portion 88 is a mid diameter portion 90 having an inner diameter sized to rotatably receive the outwardly extending prongs 76 of the stem 56. Below the mid diameter portion 90 is a large diameter lower portion 92 the inner diameter of which is sized to slidably receive the piston 64.

Figure 9:
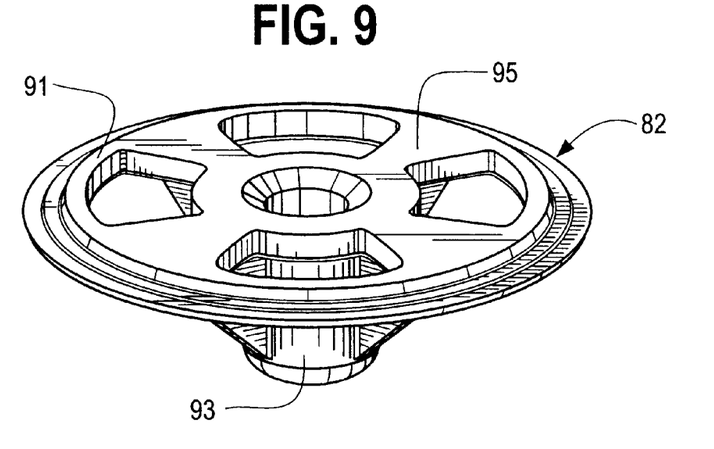
FIG. 9 is an enlarged isometric view of the bottom stop for the valve assembly shown in FIG. 2.
Figure 10:
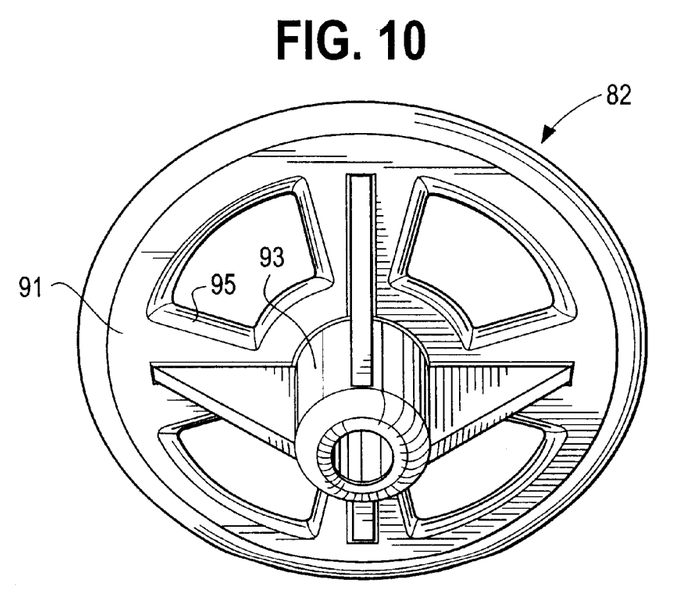
FIG. 10 is another isometric view of the bottom stop shown in FIG. 9.

Referring to FIGS. 2, 9, and 10, the stop 82 is bonded to the lower end of the large diameter portion 92 and consists of an annular outer ring 91 having an inner diameter less than that of the piston 64 thereby forming lower stop 82 for stopping downward movement of the piston 64, and a tubular hub 93, the central opening in which will slidably and rotatably receive the lower end of the stem 56. A plurality of ribs 95 retain the hub 93 to the annular outer ring 91 and allow liquid to freely move against the lower surface of the piston 64.

Referring to FIGS. 2, 6, 7, and 8 between the mid diameter portion 90 and the large diameter portion 92 of the valve housing 60 is a shoulder 94 and angularly spaced around the inner circumference of the shoulder 94 are twelve equally spaced indentations including a first set of three indentations 96—96 positioned 120 degrees apart from one another, a second set of indentations 97—97 each of which is adjacent to one of the indentations 96 and spaced 120 degrees from one another, a third set of indentations 98—98 each of which is adjacent to one of the indentations 97 and spaced 120 degrees from one another and a fourth set of indentations 99—99 each of which is between one of the indentations 96 and 98 and spaced 120 degrees from each other. Each of the sets of indentations, 96,97,98, 99 defines a plane with the plane defined by each set positioned at different axial lengths along the cylindrical housing 60.

Referring to FIGS. 4, 5, 7, and 8, the sliding float member 80 has a tubular central portion 100 and extending radially outward of the central portion 100 is a web 102 for supporting a tubular outer portion 104. Extending parallel to the axis of the tubular central portion 100 are three equally spaced fingers 106, 108, 110 positioned so as to contact one of the sets of indentations 96–99 on the shoulder 94 of the valve housing 60. The noncircular central opening 81 of the sliding float 80 mated with the noncircular portion 77 of the stem 56 insures that when the parts are assembled the fingers 106, 108, 110 have the desired orientation with respect to the indentations 96–99 of the valve housing 60.

Figure 11:
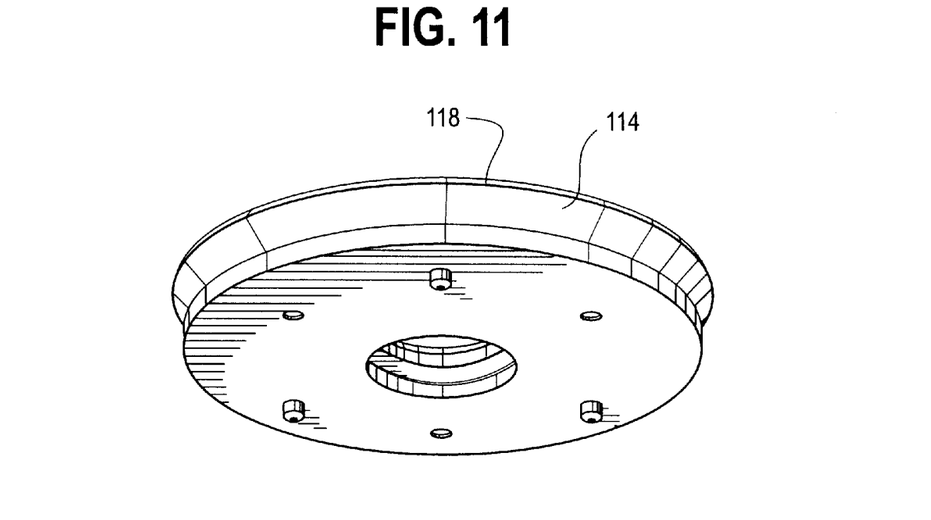
FIG. 11 is an enlarged isometric view of one half of the piston for the valve assembly shown in FIG. 2.
Figure 12:
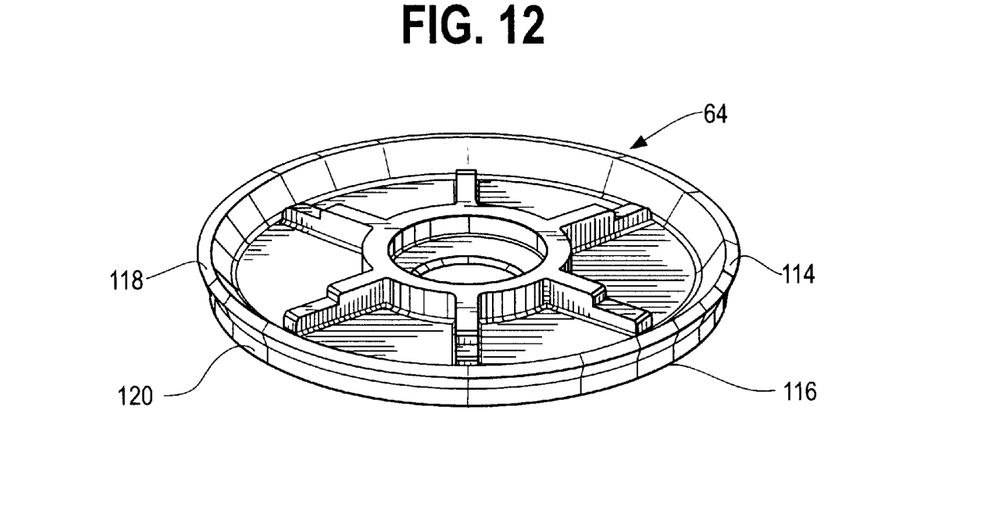
FIG. 12 is an enlarged isometric view of an assembled piston for the valve assembly shown in FIG. 2.

Referring to FIGS. 11 and 12, the piston 64 consists of back to back circular portions 114, 116 glued together with each of the portions 114, 116 having an outer annular butterfly seal 118, 120 respectively.

In accordance with the invention, the volume of the liquid being discharged from the cavity 66 is adjusted by rotation of the stem 56 thereby rotating the sliding float 80. In the depicted embodiment the volume can be adjusted to any one of four options corresponding to the longitudinal positions of the planes defined by the four sets of indentations 96–99. Since only the sliding float 80 rotates with the stem 56, the resistance to rotation is minimized. Furthermore, the coil spring 78 extends between the prongs 76 mounted on the stem and the sliding float 80, and therefore the spring 78 rotates with the stem 56. The spring 78 does not cause particles of plastic to be scraped loose and enter the liquid of the container so as to obstruct the flow of liquid through the first and second passages 68, 72.

Figure 13:
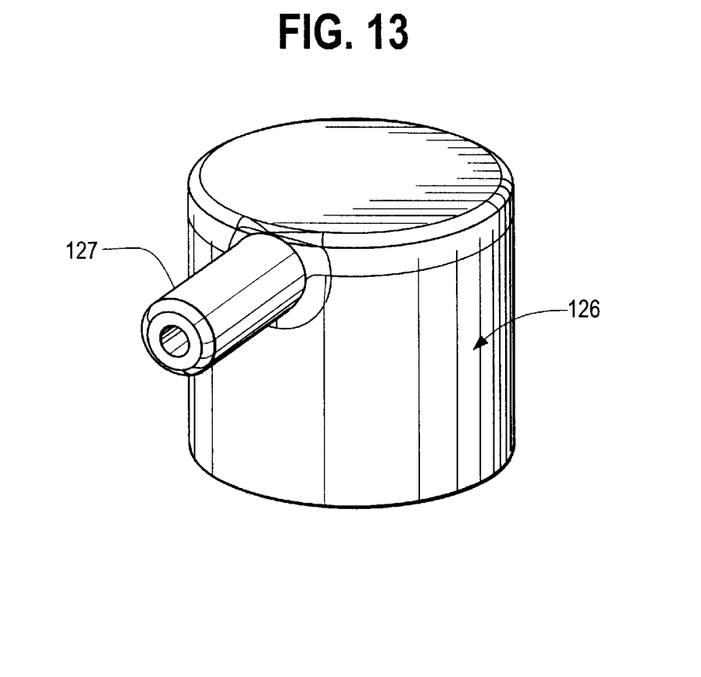
FIG. 13 is an enlarged isometric view of the nozzle for the valve assembly shown in FIG. 2.
Figure 14:
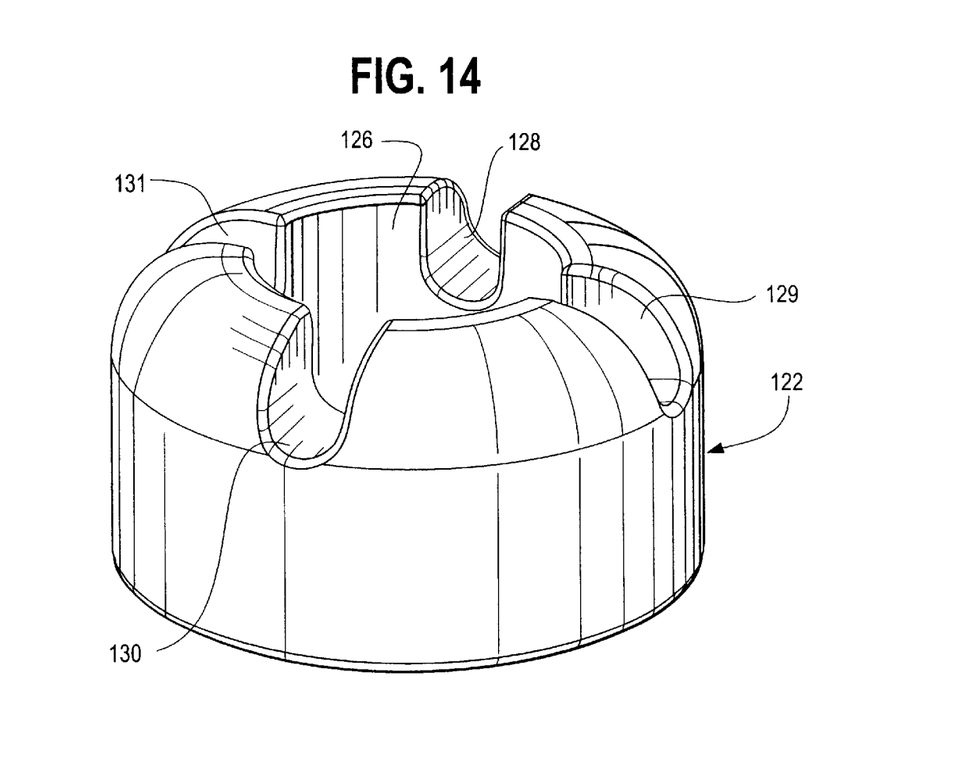
FIG. 14 is an enlarged isometric view of the cover for the dispensing device shown in FIG. 2.

Referring to FIGS. 2, 13, and 14, a plastic cover 122 is fitted over the cap 14 and includes a central bore 124 sized to slidably receive the outer circumference of a nozzle 126 fitted at the upper end of the stem 56. The nozzle 126 includes a cylindrical outlet 127 oriented perpendicularly to the axis of the stem 56. Spaced around the circumference of the cover 122 are four notches 128, 129, 130, 131, with each of the notches sufficiently large to allow the perpendicularly oriented outlet 127 to be received therein when the nozzle 126 is depressed to expel a predetermined volume of liquid from the container. The nozzle 126 can therefore be depressed only when the outlet 127 is aligned with one of the four notches 128–131 in the cover 122, which occurs when the fingers 106, 108, 110 are aligned with one of the sets of indentations 96–99, one set of indentations aligned for each of the four notches 128–131. Labels on the outer surface of the cover 122 one near each of the four notches 128–131, identify the volume of liquid to be discharged when the outlet 127 is aligned with each of the notches.

While the present invention has been described with respect to a single embodiment, it will be appreciated that many modifications and variations can be made without departing from the true spirit and scope of the invention. It is therefore the intent of the appended claims to cover all such variations and modifications which come within the true spirit and scope of the invention.

I claim:

1. In a dispensing apparatus for dispensing a quantity of pressurized liquid where said quantity of liquid can be adjustably selected, said dispensing apparatus comprising
   a reservoir for holding a quantity of said pressurized liquid,
   a metering chamber sufficient in size to retain the largest quantity of liquid to be dispensed on a single activation,
   a piston having a first surface defining a wall of said metering chamber and a second surface against which pressure from said pressurized liquid is applied,
   an elongate valve stem moveable between a first position in which said metering chamber is in communication with said reservoir and a second position in which said metering chamber is in communication with the ambient,
   said piston axially moveable with respect to said stem between a first stop defining a maximum volume of said metering chamber and a second stop defining a minimum volume of said metering chamber,
   one of said first and second stops being longitudinally adjustable upon axial rotation of said stem,
   the improvement comprising
   said stem being axially rotatable within said piston, and
   means for longitudinally adjusting said one of said first and second stops being locked for rotation with said stem and rotationally free of said piston.

2. The improvement of claim 1 and further comprising
   a stop on said stem, and
   a spring extending between said means for longitudinally adjusting and said stop.

3. A dispensing apparatus for dispensing one of a plurality of predetermined volumes of liquid comprising,
   a container for pressurized liquid,
   a valve assembly extending into said container,
   said valve assembly including an elongate stem having a first end extending outward of said container, a second end extending inward of said container, and a longitudinal axis,
   said valve assembly including a value housing end having an inner wall defining a metering chamber,
   a piston having a first surface defining a wall of said metering chamber and a second surface in contact with said pressurized liquid,
   said elongate stem axially moveable with respect to said valve housing between a first position in which said metering chamber is in communication with said reservoir and a second position in which said metering chamber is in communication with the ambient, said piston axially moveable with respect to said stem between a first stop defining a maximum volume of said metering chamber and a second stop defining a minimum volume of said metering chamber, said stem being axially rotatable with respect to said piston, a slide being axially moveable with respect to said stem and locked for rotation with said stem, said slide abutting said first surface of said piston, said slide having a contact surface, and a plurality of contact surfaces on said valve housings, said contact surfaces of said valve housing being at different angular orientations about said axis and at different longitudinal positions with respect to said axis, whereby said contact surface on said valve housing is rotatable into alignment with any one of said plurality of contact surfaces for selecting one of a plurality of predetermined volumes of liquid dispensed.

4. A dispensing apparatus in accordance with claim 3 and further comprising a spring between said stem and said slide for urging said stem outward of said container and for urging said slide toward said piston.

5. A dispensing apparatus for dispensing one of a plurality of predetermined volumes of liquid comprising, a container for pressurized liquid, a valve assembly extending into said container, said valve assembly including an elongate stem having a first end extending outward of said container, a second end extending inward of said container, and a longitudinal axis, said valve assembly including a value housing end having an inner wall defining a metering chamber, said elongate stem axially moveable with respect to said valve housing to dispense a volume of liquid from said metering chamber, said stem being axially rotatable for selecting the volume of liquid to be dispensed upon actuation of said stem, a slide on said stem, said slide being axially moveable with respect to said stem and locked for rotation with said stem, means on said slide for selecting the volume of liquid to be dispensed upon actuation of said stem, and a spring between said slide and said stem for urging said stem outward of said container and for urging said slide toward said second end of said valve assembly.

6. In a dispensing apparatus for dispensing a quantity of pressurized liquid where said quantity of liquid can be adjustably selected upon rotation of an elongate stem, said dispensing apparatus comprising a reservoir for holding a quantity of said pressurized liquid, a metering chamber, said stem axially moveable for dispensing a quantity of liquid, slide means on said stem and rotatable with said stem for selecting a volume of liquid to be dispensed with each axial movement of said stem, a spring between said slide means and said stem.

* * * * *

UNITED STATES PATENT AND TRADEMARK OFFICE
CERTIFICATE OF CORRECTION

PATENT NO. : 6,695,175 B2
DATED : February 24, 2004
INVENTOR(S) : James H. Martin It is certified that error appears in the above-identified patent and that said Letters Patent is hereby corrected as shown below:

Column 3,
Line 57, after "end 24" insert -- of --.

Column 4,
Line 6, after "spring" delete "34" and substitute -- 35 --.
Line 7, delete "24" and substitute -- 26 --.

Column 5,
Line 4, after "forming" insert -- the --.
Line 59, after "cap" delete "14" and substitute -- 54- --.

Signed and Sealed this

Seventh Day of December, 2004

JON W. DUDAS
*Director of the United States Patent and Trademark Office*